(No Model.)

J. NICKELS.
LAMP BURNER.

No. 414,166. Patented Oct. 29, 1889.

Witnesses
Geo. W. Young.
N. E. Oliphant

Inventor
John Nickels
By Stml Underwood
Attorney

UNITED STATES PATENT OFFICE.

JOHN NICKELS, OF MILWAUKEE, WISCONSIN, ASSIGNOR, BY DIRECT AND MESNE ASSIGNMENTS, OF ONE-HALF TO FREDERICK C. HANFORD, JOSEPH C. CORDES, HORACE M. BATTIN, THOMAS A. McCARTHY, AND DEMING N. HATFIELD, OF SAME PLACE, FRANK W. WOOD, OF RACINE, AND DANIEL P. SANFORD, OF MADISON, WISCONSIN.

LAMP-BURNER.

SPECIFICATION forming part of Letters Patent No. 414,166, dated October 29, 1889.

Application filed May 24, 1888. Serial No. 274,932. (No model.)

*To all whom it may concern:*

Be it known that I, JOHN NICKELS, of Milwaukee, in the county of Milwaukee, and in the State of Wisconsin, have invented certain new and useful Improvements in Lamp-Burners; and I do hereby declare that the following is a full, clear, and exact description thereof.

My invention relates to lamp-burners, and will be fully described hereinafter.

Figure 1:
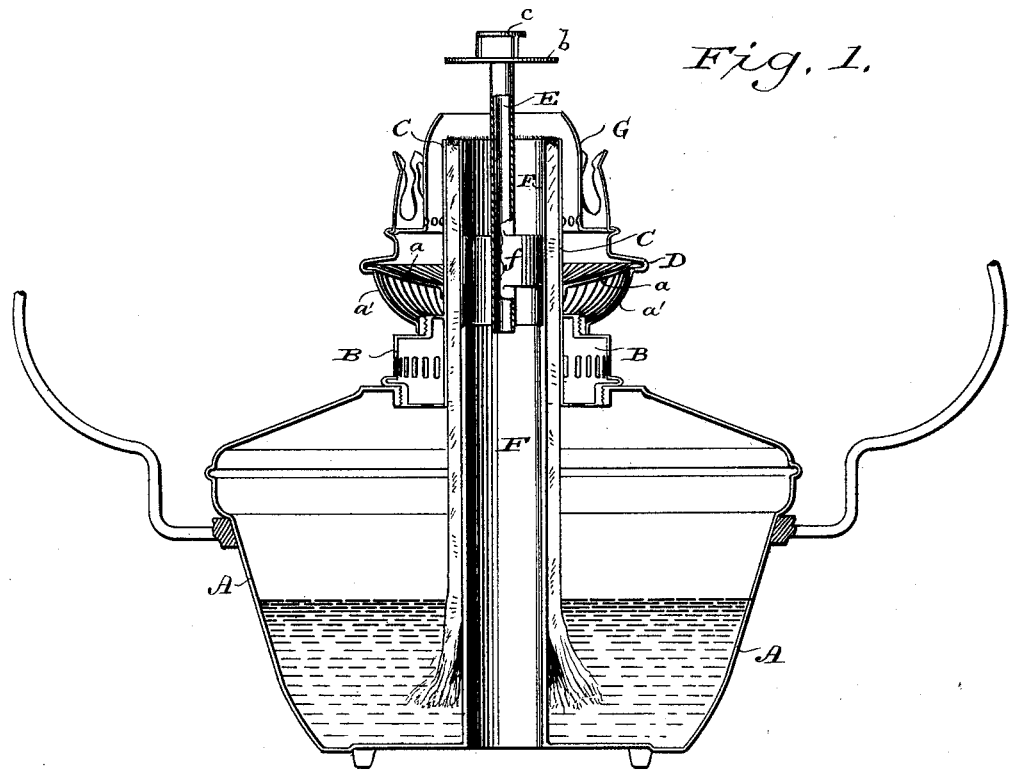
Figure 2:
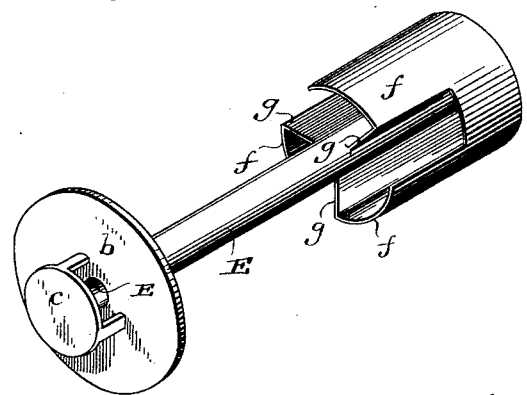

In the drawings, Figure 1 is a vertical section through the center of a lamp having my improved burner attached thereto, and Fig. 2 is a perspective view of the central deflector-tube of my burner.

A is the lamp, which is of that kind which contains a central air-tube that leads up from the bottom of the lamp through the burner.

B is the part of the burner which is screwed into the lamp and carries the wick-tube C.

D is the cone-frame, the base of which consists of two slitted walls $a\ a'$, through which the air must pass before it reaches the flame.

E is a tube which carries a disk $b$, which surrounds its upper end, and to the upper sides of this is secured the legs of another and smaller disk $c$. Both of these disks are deflectors, the disk $b$ receiving and deflecting the air that rises through the central tube F of the lamp out into the flame, and the disk $c$ performing the same office for the air that rises through the small tube E.

A barrel $f$ surrounds the lower end of tube E, and the sides of this barrel are slitted both vertically and horizontally, and the material is bent and secured to the periphery of the tube to form wings $g$ for dividing and distributing the air as it rises.

In operation the air drawn up through tube F is given a sort of spiral motion by the wings $g$ and part of it passes up tube E. The air outside of tube E is deflected by disk $b$ into the flame, and that air which escapes through tube E, striking disk $c$, is deflected to the upper edge of the flame after being heated in tube E and furnishes oxygen to support the combustion of the gases at that point. I use an ordinary cone G in my burner, and the air that gets to the cone from below must all pass through the chamber formed by the slitted walls $a\ a'$, and hence there is no danger of explosion.

Having thus fully described my invention, what I claim as new, and desire to secure by Letters Patent, is—

In a burner for a lamp provided with a central air-tube, the combination of a tube centered in said air-tube and rising above the same, with a barrel surrounding the lower end of said inner tube, having its sides slitted both vertically and horizontally and secured to the periphery of said inner tube, a deflector surrounding the upper end of the last-named tube and of greater diameter than that of the air-tube of the lamp, and a smaller disk supported on legs rising from the last-named deflector and serving as a deflector for the air passing up through the said inner or smaller tube, substantially as set forth.

In testimony that I claim the foregoing I have hereunto set my hand, at Milwaukee, in the county of Milwaukee and State of Wisconsin, in the presence of two witnesses.

JOHN NICKELS.

Witnesses:
N. E. OLIPHANT,
WM. KLUG.